(12) United States Patent
Granholm et al.

(10) Patent No.: US 9,513,897 B2
(45) Date of Patent: *Dec. 6, 2016

(54) PORTAL FOR AUTOMATIC SOFTWARE INSTALLATION AND CONFIGURATION

(75) Inventors: Axel Granholm, Raleigh, NC (US);
Chris McLeod, Raleigh, NC (US);
Christine Stephens, Raleigh, NC (US);
Darlene Donkin, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,073

(22) PCT Filed: Jul. 29, 2012

(86) PCT No.: PCT/US2012/048757
§ 371 (c)(1),
(2), (4) Date: Jan. 29, 2014

(87) PCT Pub. No.: WO2013/019689
PCT Pub. Date: Feb. 7, 2013

(65) Prior Publication Data
US 2014/0189678 A1    Jul. 3, 2014

Related U.S. Application Data

(63) Continuation of application No. 13/193,801, filed on Jul. 29, 2011, now Pat. No. 8,752,000.

(51) Int. Cl.
*G06F 9/44* (2006.01)
*G06F 9/445* (2006.01)

(52) U.S. Cl.
CPC . *G06F 8/65* (2013.01); *G06F 8/61* (2013.01); *G06F 9/4446* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 6,117,188 A * | 9/2000 | Aronberg | G06F 8/61 717/176 |
| 7,716,634 B2 | 5/2010 | Ross et al. | |
| 7,774,588 B2 * | 8/2010 | Samba | G06F 8/61 713/1 |
| 8,028,237 B2 | 9/2011 | Schmitt | |
| 8,108,183 B2 * | 1/2012 | Hein | 702/186 |
| 8,205,120 B2 * | 6/2012 | Heidasch et al. | 714/45 |
| 8,752,000 B2 | 6/2014 | Granholm et al. | |
| 2002/0184165 A1 * | 12/2002 | Deboer et al. | 706/1 |
| 2002/0197528 A1 | 12/2002 | Zunke | |
| 2003/0120624 A1 | 6/2003 | Poppenga et al. | |

(Continued)

*Primary Examiner* — Evral E Bodden
(74) *Attorney, Agent, or Firm* — Tillman Wright, PLLC; Chad D. Tillman; Jeremy C. Doerre

(57) ABSTRACT

A portal is established between a software installer and a client to allow on-line management of a software implementation project. The installer of customizable software and the client may communicate through the portal to establish specifications for the software product. The software may be implemented by incorporating preconfigured software components into the software product. A portion of the preconfigured components may be modified based on the specifications of the client. The specifications may be identified by providing the client with a set-up wizard through the portal. The set-up wizard prompts the client for information and the software system may be configured based on logic generated in response to client input.

11 Claims, 3 Drawing Sheets

(56) References Cited

U.S. PATENT DOCUMENTS

| | | |
|---|---|---|
| 2004/0250130 A1 | 12/2004 | Billharz et al. |
| 2007/0169109 A1 | 7/2007 | Meswal |
| 2007/0209006 A1 | 9/2007 | Arthurs et al. |
| 2007/0294684 A1 | 12/2007 | Kumashiro et al. |
| 2008/0033997 A1 | 2/2008 | Banker |
| 2008/0270977 A1 | 10/2008 | Nucci et al. |
| 2010/0115432 A1 | 5/2010 | Arthurs et al. |
| 2012/0036442 A1 | 2/2012 | Dare et al. |
| 2012/0185778 A1 | 7/2012 | Arthurs et al. |
| 2012/0311450 A1* | 12/2012 | Gupta ............... G06F 8/63 715/735 |
| 2013/0174143 A1 | 7/2013 | Granholm et al. |

* cited by examiner

PORTAL FOR AUTOMATIC SOFTWARE INSTALLATION AND CONFIGURATION

CROSS-REFERENCE TO RELATED APPLICATION

For purposes of the United States, the present application is a continuation of, and claims priority under 35 U.S.C. §120 to, U.S. patent application Ser. No. 13/193,801, filed Jul. 29, 2011, which application and any patent issuing therefrom are hereby incorporated herein by reference. For purposes of filings in other than the United States, the present application claims priority under the Paris Convention to U.S. patent application Ser. No. 13/193,801, filed Jul. 29, 2011.

COPYRIGHT STATEMENT

All of the material in this patent document, including computer program listing that may be included in an Appendix, if any, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The invention relates generally to a portal for on-line management of a software implementation project and, more particularly, to a portal established between a software installer and a client to facilitate set-up, configuration, maintenance and support of software.

Software is often developed and customized for use in a specific corporate environment. Since many firms do not have the resources to generate their own customized software, such companies outsource software development. At the initial stage of development, skilled experts interview a client to identify their needs and determine how to develop the product based on the identified needs.

After the software is developed in accordance with the client's specifications, the developer may provide additional services to implement and configure the software. The software company may identify and order any hardware that is necessary to provide client-side support of the software (e.g., a customized server). A representative of the software firm (e.g., a field engineer or implementation consultant) may be required to visit the client's physical site to install the software and configure any additional hardware required to support the software. The field engineer may also need to test the system and provide training before the software can be used for its intended purposes. As a result, the field engineer may be required to return to the client's physical site numerous times before the software system is operating properly.

The conventional process of implementing and configuring software is both time and cost inefficient. Software implementation may be delayed by any number of reasons due to the nature of any customized process. Such reasons may include: miscommunication between different software company representatives and the client, wrongly configured hardware, changed specifications after development has been initiated, or client employees unable to attend scheduled training sessions. In addition, costs may be increased due to the large number of experts that are required to complete the development, installation, testing and training processes. Accordingly, what is needed is an improved method for implementing customized software that reduces costs and that shortens the time required to implement, configure and support a complete software product.

SUMMARY OF THE INVENTION

The invention generally establishes a portal between a software installer and a client to provide on-line management of a software implementation project. The portal may be used to facilitate project and installation scheduling as well as configuration, distribution, maintenance and support of the software. The installer and the client may communicate through the portal beginning at the earliest implementation stages to establish details of an implementation contract including assigning a project manager at the software company and identifying specifications required by the client.

The client may be provided with a set-up wizard through the portal. The set-up wizard prompts the client for information such that the software system may be configured based on logic generated in response to client input. Data may be migrated through the portal from the client to be stored in and accessed from memory at the installer side of the portal. The migrated data may also be converted to a format that is compatible with the reconfigured software. Communication links may be established between the client and third party entities (e.g., insurance providers, pharmacies) via the portal. Client-side users may be trained to interact with the software via tutorials that may be accessed at any time from the installer through the portal.

The installer may have a variety of different standardized software components that are used in any platform regardless of the particular software configuration. Examples of such software components may include application programming interfaces, conversion modules, work flows, tools, peripherals, plug-ins, and the like. Accordingly, a significant portion of the software system may be preconfigured for any specific application. In many cases, only some of the software components require modification based on the client's specifications before being incorporated into the configured software product. Since many of the software components may be used in the same software, the automation of repetitive product set-up is facilitated.

In accordance with embodiments of the invention, a computer-implemented method may configure software by exchanging data through a web portal established between a software installer and a client. A set-up wizard is provided from the installer to the client through the portal. The set-up wizard prompts a user at the client to input data regarding software to be configured for the client. The input data is received at the set-up wizard via the portal. At least some of the accessed software components are modified based on the received input data to generate the software configuration.

In one feature, the method includes migrating data from the client through the portal for storage in memory at a location external to the client. The migrated data may be accessible by the installer and the client.

In another feature, the method includes providing the configured software from the installer to the client via the portal.

In yet another feature, the method includes providing a tutorial from the installer to the client via the portal. User input is received via the portal while executing the tutorial at the client.

In still another feature, the method includes providing a link from the client to a third party entity via the portal.

In still yet another feature, a portion of the accessed software components is preconfigured such that modification of the portion of the accessed software components is not necessary to generate the configured software.

BRIEF DESCRIPTION OF THE DRAWINGS

A more complete understanding of the invention may be derived by referring to the detailed description and claims when considered in connection with the Figures, wherein like reference numbers refer to similar elements throughout the Figures.

DETAILED DESCRIPTION

The detailed description of exemplary embodiments of the invention herein makes reference to the accompanying drawings, which show the exemplary embodiment by way of illustration. While these exemplary embodiments are described in sufficient detail to enable those skilled in the art to practice the invention and reveal the best mode of doing so, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention establishes a portal between a software installer and a client to allow on-line management of a software implementation project. The installer and the client may communicate through the portal to establish specifications required by the client. These specifications may be identified by providing the client with a set-up wizard through the portal. The set-up wizard prompts the client for information such that the software system may be configured based on logic generated in response to client input.

The installer has access to a wide range of preconfigured software components. Some of the software components may require modification based on the client's specifications. Since many of the software components do not require modification, the process of configuring the software product may be expedited.

In one feature, existing client-side data may be migrated through the portal from the client for storage in memory external to the client and converted to a format that is compatible with the software. In another feature, communication links may be established between the client and third party entities via the portal. In yet another feature of the invention, client-side users may be trained to interact with the software via tutorials that may be accessed at any time from the installer through the portal.

Figure 1:
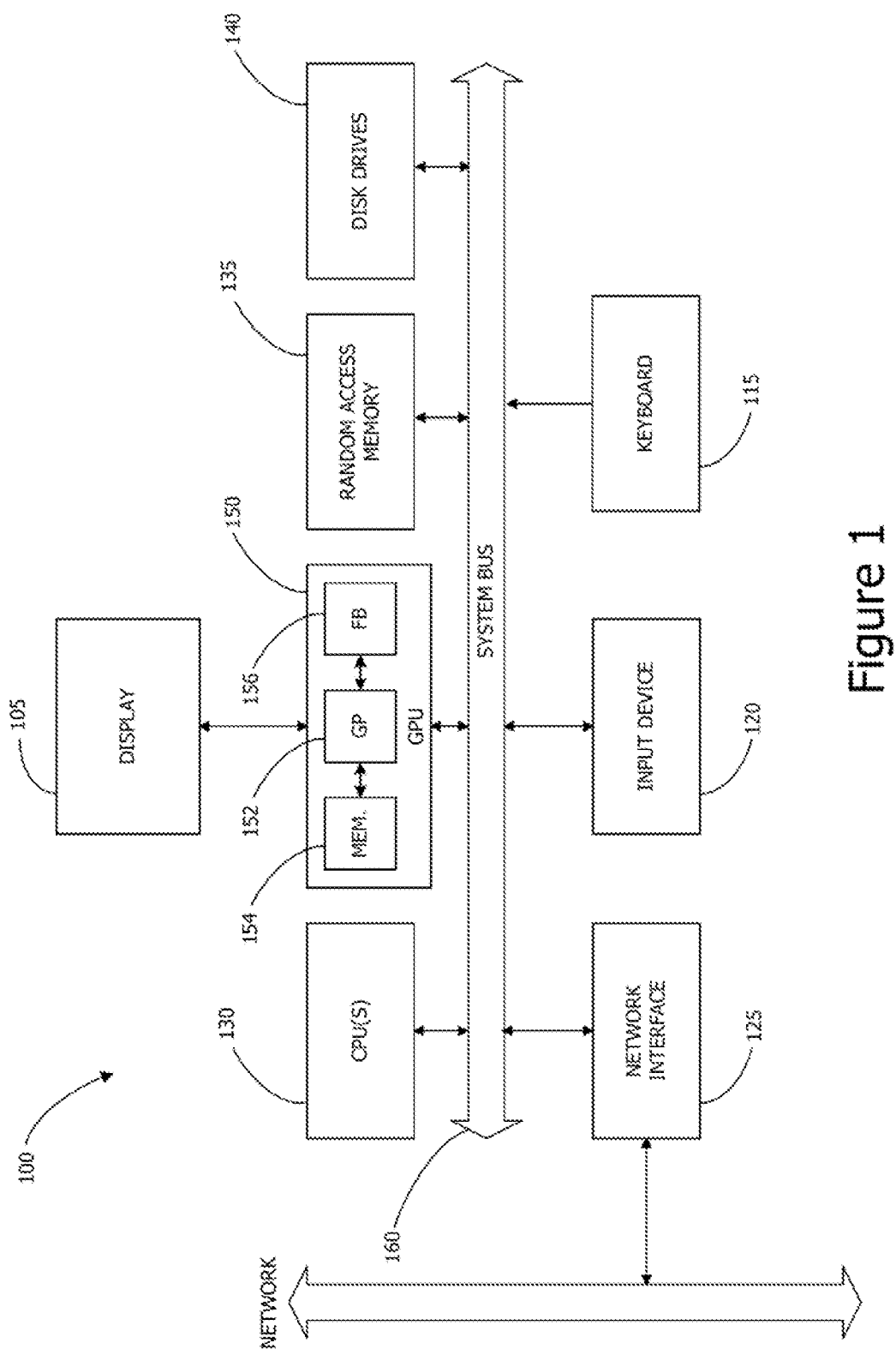
FIG. 1 illustrates a block diagram of a computer system that may be used to practice embodiments of the present invention.

Turning to the drawings, FIG. 1 illustrates a block diagram of a computer system that may be used to practice embodiments of the present invention. FIG. 1 is merely illustrative of an embodiment incorporating the present invention and does not limit the scope of the invention as recited in the claims. One of ordinary skill in the art would recognize other variations, modifications, and alternatives.

In one embodiment, computer system 100 typically includes a display 105, a keyboard 115, an input device 120, and a network interface 125. In various embodiments, the input device 120 is typically embodied as a computer mouse, a trackball, a track pad, a joystick, wireless remote, drawing tablet, voice command system, eye tracking system, and the like. The input device 120 typically allows a user to select objects, icons, text and the like that appear on the monitor 105 via a command such as a click of a button or the like.

Embodiments of the network interface 125 typically include an Ethernet card, a modem (telephone, satellite, cable, ISDN), (asynchronous) digital subscriber line (DSL) unit, FireWire interface, USB interface, and the like. For example, the network interface 125 may be coupled to a computer network, to a FireWire bus, or the like. In other embodiments, the network interface 125 may be physically integrated on the motherboard of a computer, and may be a software program, such as soft DSL, or the like.

In various embodiments, computer system 100 typically includes familiar computer components such as one or more central processing units (CPU) 130, memory storage devices, such as a random access memory (RAM) 135 and disk drives 140, a graphics processing unit (GPU) 150, and a system bus 160 interconnecting the computer components.

Embodiments of the invention may take the form of a computer program product on a tangible, computer-readable storage medium having computer-readable program code means embodied in the storage medium. RAM 135 and the disk drives 140 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), magnetic storage devices, battery-backed volatile memories, networked storage devices, and the like.

In some embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 150 may be any conventional graphics processing unit that may be user programmable. In this example, GPU 150 includes a graphics processor 152, a number of memories and/or registers 154, and a number of frame buffers 156.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers.

Embodiments of the invention are described herein in terms of functional block components, screen shots, optional selections and various processing steps. It should be appreciated that such functional blocks may be realized by any number of hardware and/or software components configured to perform the specified functions. For example, the invention may employ various integrated circuit components (e.g., memory elements, processing elements, logic elements, look-up tables, ETC.), which may carry out a variety of functions under the control of one or more microprocessors or other control devices. Similarly, the software elements of the invention may be other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc.

Figure 2:
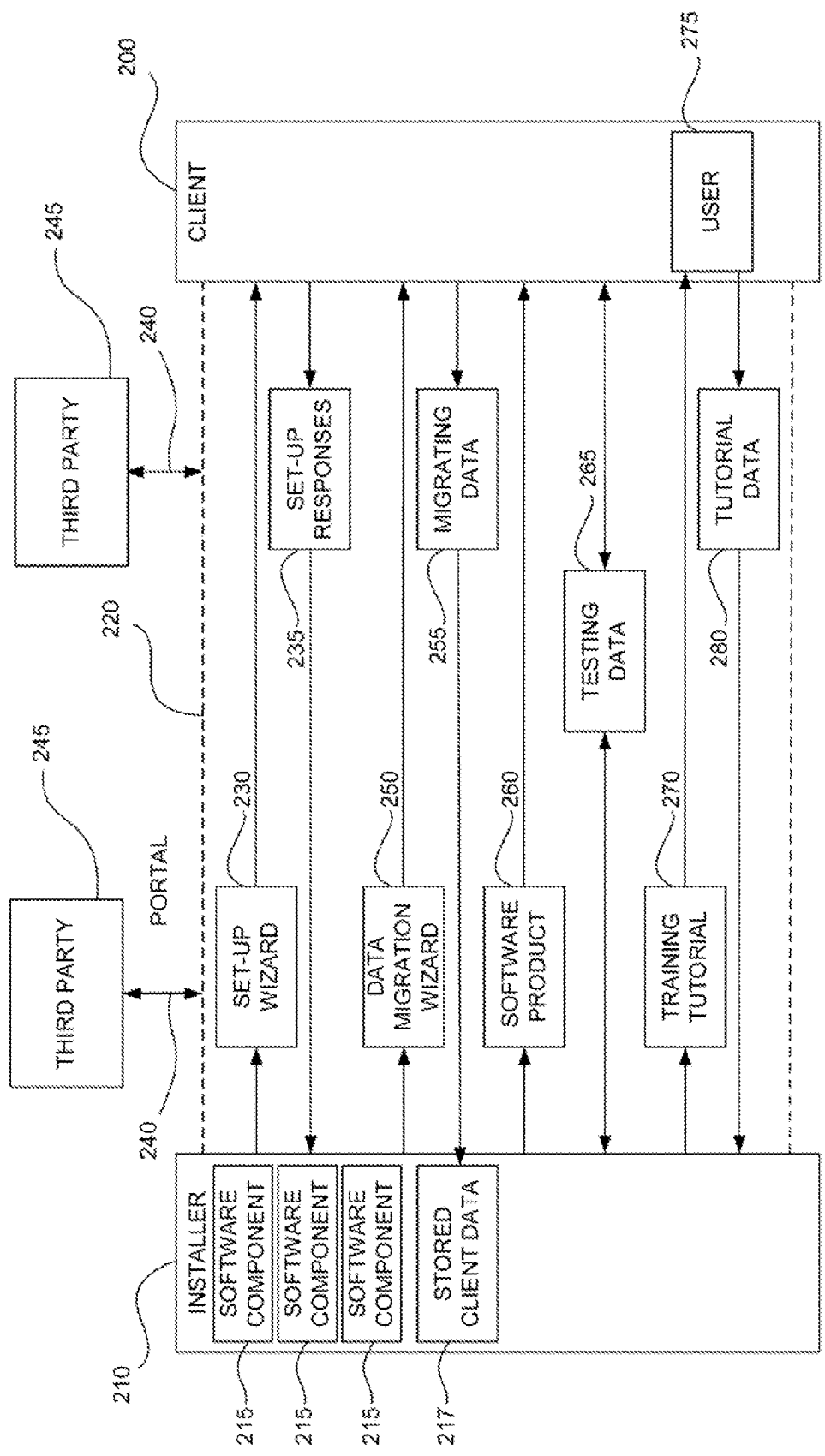
FIG. 2 illustrates a block diagram showing a portal that is established between an installer and a client to facilitate a software implementation process, in accordance with embodiments of the invention.

FIG. 2 illustrates a block diagram showing a web portal that is established between two entities to facilitate an on-line software implementation process, in accordance with embodiments of the invention.

The client 200 may represent any entity that requires customizable software, while the installer 210 may represent a software development entity that has been hired by the client 200 to configure and install the software. For purposes of explanation alone, the client 200 may be a health care facility such as a hospital, an out-patient health care clinic or a doctor's office, and the installer 210 may be an organization that develops software for the healthcare industry. However, as one having ordinary skill in the art of computing would appreciate, the invention is not so limited.

The client 200 initiates the software implementation process by informing the installer 210 that the client 200 requires implementation of customizable software for its organization. After agreeing on the basic terms for providing the software including the appointment of a project manager, the installer 210 establishes a portal 220 directly to the client 200. The portal 220 may be defined as a web site that may provide links to information provided by the installer 210. A project manager appointed to the implementation project may act as a main point of contact between the client and the installer.

The portal 220 is established to provide access control and procedures for multiple applications that, when executed, cause data to be transferred between the installer 210 and the client 200. Specifically, the portal 220 allows both the installer 210 and the client 200 to manage the software implementation project. The portal 220 provides the client 200 and the installer 210 with information regarding the status of every project task performed or scheduled to be performed. For example, the portal 200 may be used to facilitate project scheduling as well as configuration, distribution, implementation, support and maintenance of the software (as discussed in detail below).

Once the portal 220 is established, the installer 210 and the client 200 may use the portal 220 to negotiate the terms of a contract. The client 200 may set forth the specifications required for the software product. Other terms may be established using the portal 220 such as those related to budgeting, projected implementation date, status updates, testing procedures, and training plans.

The client 200 may require a software product that provides a unique set of functionality. The unique aspects may be based on the application for which the software is being configured, the hardware used by the client, the operating system platform operated by the hardware, and the amount of available memory, to name a few. Conventionally, a representative of the software company would be required to assess the client's intended use of the software and to identify different aspects of the client's computing environment such that the software would provide the desired results while also being compatible with the client's computing environment.

In order to reduce the amount of manpower required to implement the software, a set-up wizard 230 may be provided to the client 200 through the portal 220. The set-up wizard 230 prompts the client for information regarding the application specifications required by the client 200 and information related to the client's existing computing system. Example questions proposed to the client 200 by the set-up wizard 230 may include the following: Do you want a laboratory interface established? Do you want to make templates available from the new software?

The client 200 provides set-up responses 235 to the questions proposed by the set-up wizard 230. The set-up responses 235 may be provided to the installer 210 as logic input such that the software system may be configured and installed based on the logic generated in response to client input.

The installer 210 requirements for implementing identifies the client's the software different system in response to receiving the set-up responses 235. Some of the requirements may need to be implemented by generating software code specifically for the client 200. Other requirements may be fulfilled by accessing any of a variety of prefabricated, standardized software components 215 that may be used in many different platforms regardless of the particular software configuration (e.g., work flows, tools, application programming interfaces, conversion modules, peripherals, etc.) Some of the preconfigured software components 215 may require modification based on the client's set-up responses to provide a software product that operates within the client's established specifications. Accordingly, since a significant portion of the software system may be preconfigured for any specific application, some of the steps in implementing the customizable software product may be automated.

The set-up wizard 230 may also be used to establish communication links 240 between the client 200 and third party entities 245 via the portal 220. The third party entity 245 may be an insurance provider, a laboratory, a pharmacy, a healthcare specialist, a government agency, a data storage facility or any other entity that may require data that is transmitted through the portal between the client 200 and the installer 210.

As stated above, the set-up wizard 230 is controlled by the installer 210 for eliciting information from the client 200. When the set-up wizard 230 requires updating or correction, only the version of the set-wizard 230 that is stored at the installer 210 need be modified before being distributed to the client 200. This feature is advantageous because each individual client does not require a specific update to the set-up wizard 230 thereby reducing the amount of client-installer interaction.

After the initial configuration of the software system is established based on the set up wizard 230, the installer 210 may forward a data migration wizard 250 to the client 200. The client 200 may interact with the data migration wizard 250 to establish parameters for having data automatically entered into the software system such that the data is available for access by the newly configured software. The data to be migrated may include existing patient records including personal information, medical history, prescriptions, previously observed symptoms, laboratory results, etc. Other data that may be migrated includes billing information such as the codes used to identify different medical procedures. In response to client input to the data migration wizard 250, the data 255 may be retrieved from client memory and stored in memory 217 at the installer 210. In some embodiments, the migrated data (or a portion of the migrated data) may be stored at a third party 245 that is also connected to the portal 220. If necessary, the installer 210 or the third party 245 may convert the migrated data into a format that is compatible with the newly configured software system.

The installer 210 may further configure the software system in accordance with the client's specifications. This process may include retrieving the software components 215 that are required for the software product, and modifying some of the software components 215 based on the set-up responses 235. The installer 210 may also develop new software components by writing additional code to include components that were not preconfigured and to support the software product in the client's computing environment. Additional required hardware may also be ordered and installed at the client 200 to support the software system.

When an initial configuration of the software product 260 is completed, the software product 260 may be delivered from the installer 210 to the client 200 via the portal 220. If all of the required hardware is installed at the client 200, the installer 210 may be able to complete the installation process through the portal 220 without being physically present at the client's site. A testing process may then be executed by exchanging testing data 265 between the installer 210 and the client 200 to insure that the software is operating in accordance with the client's specifications. The testing process may also check whether the migrated data 217 stored at the installer 210 or the third party 245 is accessible to the client 200 via the portal 220.

Once the completed software product 260 is installed at the client 200 and the data is accessible to operate the system, training tutorials 270 may be provided at any time to educate users 275 at the client 200. A user 275 who requires training may submit a request to the installer 210 through the portal 220 to access the training tutorial 270. In response, the installer 210 provides the training tutorial 270 to the client 200. As the user 275 interacts with the training tutorial 270 at the client 200, tutorial data 280 is generated and may be forwarded to the installer 210 through the portal 220.

Figure 3:
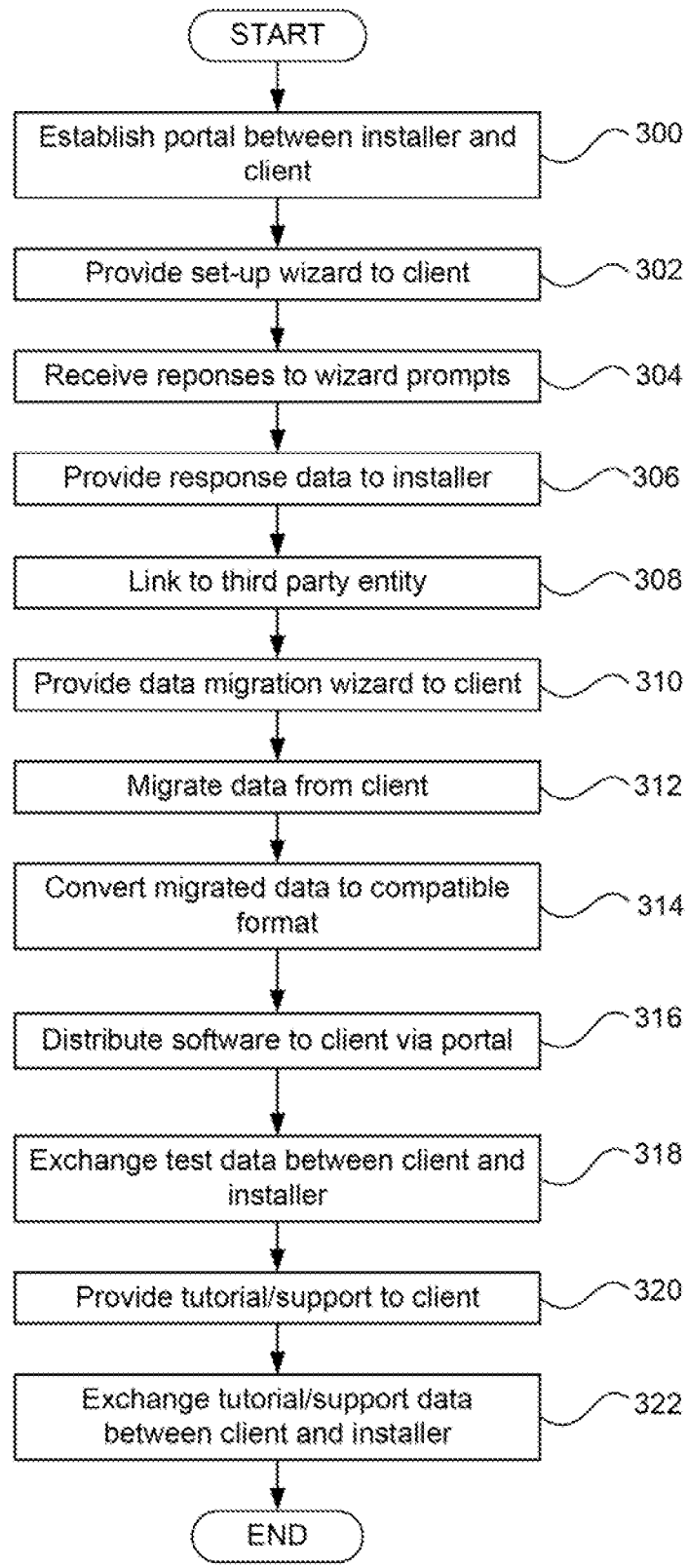
FIG. 3 is a flow diagram illustrating a method for utilizing a portal that is established between an installer and a client to facilitate a software implementation process, in accordance with embodiments of the invention.

FIG. 3 is a flow diagram illustrating a method for utilizing a portal that is established between a software installer and a client to facilitate a software implementation process, in accordance with embodiments of the invention. Before the process begins, the client and the installer participate in preliminary discussions to identify whether the installer can configure a software product that meets the client's needs.

After the client hires the installer to implement a customizable software system, a portal is established between the installer and the client (step 300). The portal may be established as a web site that is accessible only to the client such that the client can communicate directly with the installer to facilitate management of the software configuration process. A project manager may be appointed to handle all incoming communications from the client to manage scheduling of configuration, distribution, implementation, support and maintenance of the software. The portal allows both the installer and the client to assess the status of any specific task of the software implementation process.

The portal is used to provide a set-up wizard to the client (step 302). The set-up wizard provides a series of prompts to the user to identify specific client needs regarding specifications of the software product to be implemented. The prompts may also illicit information from the user to identify the capabilities of the existing hardware system used by the client that is intended to support the software product. The set-up wizard may also be used to establish specific contract terms regarding the configuration of the software.

The client receives the responses to the set-up wizard prompts from the user (step 304). The user may enter the information by any known data input technique. In some cases, some responses to the prompts may be determined by scanning the hardware or memory on the client-side such that a user is not required to physically enter any data in response to the prompt.

As data is collected in reply to the prompts from the set-up wizard, the collected data is provided from the client to the installer via the portal (step 306). The installer may provide additional prompts at any time during the implementation process in order to illicit any additional information that may be necessary to continue configuring the software.

The data received from the client in response to the prompts from the set-up wizard may identify that the client desires a communication link between the client and a third party entity. Accordingly, the installer includes the communication link from the client to a third party entity via the portal (step 308). The communication link allows the client to communicate directly with a desired third party entity without having to circumvent the portal established between the client and the installer. Examples of such third party entities may include a laboratory, a specialist, a general practitioner, a hospital, a pharmacy, an insurance provider or a data storage facility.

The installer may provide a data migration wizard to the client via the portal (step 310). The data migration wizard prompts the client to prompt the client to determine if the client approves the transfer of existing data to the installer or a third party and to identify which data is to be migrated. Data migration from client memory to the installer or a third party data storage facility would prevent the need to re-enter existing data for access by the implemented software product. Also, the data would be readily accessible from and managed by the installer or third party thereby easing the burden of data management at the client.

In response to client input to the data migration wizard, the existing data may be migrated from the client to the installer or third party via the portal (step 312). The data that is migrated may include any data stored at the client that may be required to be accessed by the implemented software product (e.g., patient records, medical history, insurance information, billing and accounting information, etc.) The data may be retrieved from memory at the client-side and transferred to memory at the installer or third party via the portal.

The migrated data may not be in a format that is compatible with the re-configured software system. Accordingly, the migrated data may be converted to a format that is compatible with the software product configured by the installer (step 314).

Once the software system is configured in accordance with client specifications and the data is accessible in a suitable format, the software product is distributed to the client via the portal (step 316). The installer may also provide software installation instructions to the client through the portal.

After the software is installed, the installer may test the software via the portal by initiating a data exchange between the installer and the client (step 318). In response to test results, the installer may modify the software to overcome any errors. The modifications may be provided to the client via the portal.

A new user at the client may request installer support or training to become familiar with the newly configured system. In response, the client submits the requested support information or a tutorial via the portal for access by the new user (step 320). As the new user interacts with the support information/tutorial, data is exchanged between the client and the installer via the portal (step 322).

As described above, a portal is provided between a client and a software installer to facilitate a software configuration process. The portal improves information exchange between the client and the installer. The client may access a wizard and other tools via the portal to configure and implement a software system. The portal allows many repeatable steps in the configuration and installation processes to be automated because many software products include many of the same components.

Although the present invention is described with respect to software configuration in the healthcare field, the invention is not so limited. That is, it is contemplated that the invention may be used with any software that is implemented for any type of use in any field.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the invention is accordingly to be limited by nothing other than the appended claims. All structural and functional equivalents to the elements of the above-described exemplary embodiments that are known to those of ordinary skill in the art are expressly incorporated herein by reference and are intended to be encompassed by the present claims. Further, no element described herein is required for the practice of the invention unless expressly described as "essential" or "critical."

It should be understood, however, that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method for configuring software for implementation in a specific computing environment of a client computer, the method comprising:
   (a) prior to loading of the software in the specific computing environment of the client computer, electronically sending over the Internet, by an on-line computer to the client computer, computer-executable instructions which, when executed on the client computer, prompts a user at the client computer to input data regarding the specific computing environment of the client computer in which the software is to be implemented;
   (b) prior to loading of the software in the specific computing environment of the client computer, electronically receiving over the Internet, by the on-line computer from the client computer, the input data regarding the specific computing environment in which the software is to be implemented;
   (c) prior to loading of the software in the specific computing environment of the client computer,
      (i) accessing, by the on-line computer, software components for generating software,
      (ii) modifying, by the on line computer as part of an automated process, at least one of the accessed software components based on the received input data, and
      (iii) using the accessed software components, including the at least one modified accessed software component, generating the software that is to be implemented in the specific computing environment of the client computer,
      (iv) wherein the at least one modified accessed software component is modified such that the software that is generated is configured to be implemented in the specific computing environment of the client computer; and
   (d) electronically distributing over the Internet, by the on-line computer to the client computer, the generated software for implementation in the specific computing environment of the client computer;

(e) electronically receiving over the Internet, by the on-line computer from the client computer, test data results from testing of the distributed software in the specific computing environment;

(f) thereafter,
  (i) accessing, by the on-line computer, software components for generating software,
  (ii) modifying, by the on-line computer as part of an automated process, at least one of the accessed software components based on the received test data results, and
  (iii) using the accessed software components, including the at least one modified accessed software component, further generating software that is to be implemented in the specific computing environment,
  (iv) wherein the at least one modified accessed software component is modified such that the software that is further generated is configured to be implemented in the specific computing environment; and (g) electronically distributing over the Internet, by the on-line computer to the client computer, the further generated software for implementation in the specific computing environment.

2. The method of claim 1, wherein the on-line computer and the client computer communicate through a web portal for on-line management of software implementations, and wherein the method further comprises migrating data from the client computer through the web portal to a data storage facility.

3. The method of claim 2, wherein the distributed software for implementation in the specific computing environment is configured to access the migrated data.

4. The method of claim 1, wherein the on-line computer and the client computer communicate through a web portal for on-line management of software implementations, and wherein the software for implementation in the specific computing environment is distributed from the on-line computer to the client computer through the web portal.

5. The method of claim 1, wherein the on-line computer and the client computer communicate through a web portal for on-line management of software implementations, and wherein the method further comprises providing a tutorial from the on-line computer to the client computer via the web portal.

6. The method of claim 1, further comprising installing the further generated and distributed software in the specific computing environment.

7. A computer-implemented method for generating software configured for implementation in a particular computing environment of a computer of a client by exchanging data through a web portal established between a software installer and the client, the method comprising:

prior to loading of the software in the particular computing environment of the computer of the client, receiving via the web portal, at a computer of the software installer, data from the computer of the client, wherein the data relates to the particular computing environment of the computer of the client in which software is to be implemented;

prior to loading of the software in the particular computing environment of the computer of the client, accessing software components for generating software;

prior to loading of the software in the particular computing environment of the computer of the client, modifying, as part of an automated process, at least one of the accessed software components based on the received data in order to generate software that is configured to be implemented in the particular computing environment and, based thereon, generating software configured to be implemented in the particular computing environment; and prior to loading of the software in the particular computing environment of the computer of the client, communicating, via the web portal, the generated software from the computer of the software installer to the computer of the client for implementation of the generated software in the particular computing environment;

electronically receiving, via the web portal, by the computer of the software installer from the computer of the client, test data results from testing of the generated software implemented in the particular computing environment;

accessing, by the computer of the software installer, software components for generating software; modifying at least one of the accessed software components based on the received test data results; and using the accessed software components, including the at least one modified accessed software component, further generating software that is to be implemented in the particular computing environment; wherein the at least one modified accessed software component is modified such that the software that is further generated is configured to be implemented in the particular computing environment; and communicating via the web portal, by the computer of the software installer to the computer of the client, the further generated software for implementation in the particular computing environment.

8. The method of claim 7, further comprising receiving, via the web portal, at a data storage facility, data migrated from the computer of the client.

9. The method of claim 8, wherein the generated software implemented in the particular computing environment is configured to access the migrated data at the data storage facility.

10. The method of claim 7, further comprising installing the further generated software in the particular computing environment at the computer of the client.

11. A method for configuring software for implementation in a specific computing environment of a client computer, the specific computing environment comprising a specific operating system, the method comprising:

(a) prior to loading of the software in the specific computing environment of the client computer, electronically sending over the Internet, by an on-line computer to the client computer, computer-executable instructions which, when executed on the client computer, prompts a user at the client computer to input operating system data regarding the specific operating system of the specific computing environment of the client computer in which the software is to be implemented;

(b) prior to loading of the software in the specific computing environment of the client computer, electronically receiving over the Internet, by the on-line computer from the client computer, the input operating system data regarding the specific operating system of the specific computing environment in which the software is to be implemented;

(c) prior to loading of the software in the specific computing environment of the client computer,
  (i) accessing, by the on-line computer, software components for generating software, (ii) modifying, by the on-line computer as part of an automated process, at least one of the accessed software components based on the received input operating system data, and (iii) using the accessed software components, including the at least one modified accessed software component, generating the software that is to be implemented in the specific computing environment of the client computer, (iv) wherein the at least one modified accessed software component is modified such that the software that is generated is configured to be implemented in the specific computing environment of the client computer; and (d) electronically distributing over the Internet, by the on-line computer to the client computer, the generated software for implementation in the specific computing environment of the client computer;

(e) electronically receiving over the Internet, by the on-line computer from the client computer, test data results from testing of the distributed software in the specific computing environment;

(f) thereafter, (i) accessing, by the on-line computer, software components for generating software, (ii) modifying, by the on-line computer as part of an automated process, at least one of the accessed software components based on the received test data results, and (iii) using the accessed software components, including the at least one modified accessed software component, further generating software that is to be implemented in the specific computing environment, (iv) wherein the at least one modified accessed software component is modified such that the software that is further generated is configured to be implemented in the specific computing environment; and (g) electronically distributing over the Internet, by the on-line computer to the client computer, the further generated software for implementation in the specific computing environment.

* * * * *

UNITED STATES PATENT AND TRADEMARK OFFICE
CERTIFICATE OF CORRECTION

PATENT NO. : 9,513,897 B2  
APPLICATION NO. : 14/236073  
DATED : December 6, 2016  
INVENTOR(S) : Axel Granholm et al.

Page 1 of 1

It is certified that error appears in the above-identified patent and that said Letters Patent is hereby corrected as shown below:

In Claim 1, Column 10, Line 50, "on line" is deleted and replaced with --on-line--.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*